US008125739B2

(12) United States Patent  
Suzuki et al.

(10) Patent No.: US 8,125,739 B2
(45) Date of Patent: Feb. 28, 2012

(54) DISK DRIVE DEVICE AND MAGNETIC DISK DRIVE

(75) Inventors: Takao Suzuki, Kanagawa (JP); Hiroki Kitahori, Kanagawa (JP); Kenji Tomida, Kanagawa (JP); Takeji Sumiya, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 475 days.

(21) Appl. No.: 12/321,956

(22) Filed: Jan. 26, 2009

(65) Prior Publication Data

US 2009/0207530 A1    Aug. 20, 2009

(30) Foreign Application Priority Data

Feb. 2, 2008    (JP) .................................. 2008-023404

(51) Int. Cl.
*G11B 5/54*    (2006.01)
*G11B 21/22*   (2006.01)

(52) U.S. Cl. .................... 360/256.4; 360/256; 360/256.6
(58) Field of Classification Search ................ 360/256.4
See application file for complete search history.

(56) References Cited

U.S. PATENT DOCUMENTS

| 5,305,170 | A  | * | 4/1994  | Dion ........................... 360/256.4 |
| 6,185,074 | B1 | * | 2/2001  | Wang et al. ................. 360/256.4 |
| 6,535,357 | B1 | * | 3/2003  | Misso et al. ................. 360/256.2 |
| 6,535,359 | B1 | * | 3/2003  | Boutaghou ................. 360/256.4 |
| 6,822,835 | B2 | * | 11/2004 | Kim ............................ 360/256.2 |
| 7,068,472 | B2 | * | 6/2006  | Yoo et al. .................... 360/256.1 |
| 7,532,439 | B2 | * | 5/2009  | Byun et al. ................. 360/256.4 |
| 7,535,679 | B2 | * | 5/2009  | Kim et al. ................... 360/256.2 |
| 2001/0036147 | A1 | * | 11/2001 | Koester et al. ................ 369/256 |
| 2002/0141116 | A1 | * | 10/2002 | Hong et al. ................. 360/256.4 |
| 2004/0179305 | A1 | * | 9/2004  | Miyamoto et al. ......... 360/256.4 |
| 2005/0013054 | A1 |   | 1/2005  | Miyamoto et al. |
| 2008/0055783 | A1 | * | 3/2008  | Heo et al. ...................... 360/256 |

FOREIGN PATENT DOCUMENTS

JP    2001-014815    1/2001

* cited by examiner

*Primary Examiner* — Son Mai

(57) ABSTRACT

Embodiments of the present invention securely latch an actuator rotated by an external impact. In an embodiment of the present invention, a latch and an actuator have a structure in which the latch can latch the actuator at two different swing angles. The swing angle of the latch is an angle in rotation centered on a rotational shaft (rotation angle). The latch may be engaged with the actuator at a shallow angle, or the latch may be engaged with the actuator at a deeper angle. Since the latch is able to latch the actuator at different swing angles, the actuator can be securely latched.

17 Claims, 9 Drawing Sheets

(a)

(b)

(a)

(b)

(a)

(b)

(a)

(b)

DISK DRIVE DEVICE AND MAGNETIC DISK DRIVE

CROSS-REFERENCES TO RELATED APPLICATION

The instant nonprovisional patent application claims priority to Japanese Patent Application No. 2008-023404 filed Feb. 2, 2008 and which is incorporated by reference in its entirety herein for all purposes.

BACKGROUND OF THE INVENTION

In a hard disk drive (HDD), which is an example of a magnetic disk drive, a magnetic head supported by an actuator is positioned to a given track on a spinning magnetic disk to read and write data. On the magnetic disk, a data area where data are to be recorded is defined. At the end of operation of the HDD, the magnetic head is moved to a predetermined stand-by position outside the data area by the actuator and is retained at the stand-by position during non-operation of the HDD to protect data on the data area.

If a HDD receives any impact from the outside during non-operation, the actuator may rotate due to the impact so that the magnetic head may go back to the data area. On this occasion, the magnetic head may destroy data. Therefore, HDDs have latch mechanisms for latching actuators to retain the actuators outside the data area (refer to Japanese Patent Publication No. 2001-14815 "Patent Document 1", for example). As representative latch mechanisms, magnetic latches and mechanical latches have been known in the art.

One of the typical magnetic latches has a mechanism for holding an actuator by a magnet embedded in a rubber attracting an iron chip attached to a tip end of the actuator. The magnetic latch requires a sufficient magnetic force to keep attracting the actuator so as to hold the actuator against an impact. In the meanwhile, to reduce the used amount of materials, the magnet in a voice coil motor (VCM) may be reduced in size.

The smaller the magnet, the less the torque constant in the VCM. Thus, an HDD with a smaller VCM torque constant may not be able to exert sufficient torque for pulling the actuator away from the magnetic latch at the start-up of the HDD. On the other hand, if the attracting power is reduced to be weak enough for pulling the actuator away from the magnetic latch, a problem arises that the actuator cannot be held against an impact.

Mechanical latches latch actuators mechanically so that the functions are not affected by VCM magnets like the magnetic latches. As typical mechanical latches, two-piece mechanical latches have been known in the art. A two-piece mechanical latch has a mechanism in which a long lever and a short bar are combined and can handle both of clockwise and counterclockwise external impacts. The long lever is rotated by an inertia force induced by an external force and the short bar engaged with the long lever opens and closes with the motion of the long lever to latch the actuator.

In the two-piece mechanical latch, however, when the HDD is in vibration, the long lever starts vibrating to cause harmful vibration to the HDD. Besides, for free rotation of the long lever and because of a small mounting space for the long lever, a common long lever is not fixed in the axial direction but has an amount of play, which may cause particularly large vibration. Such vibration of the mechanical latch may induce vibration of the actuator or the magnetic head to cause an error in the HDD. Since a two-piece mechanical latch requires two components of the long lever and the short bar to be used in combination, the number of components as well as the number of steps in assembling the latch will be greater so that the two-piece latch has limitations in contribution to the product cost reduction.

One-piece mechanical latches (single latches) can overcome the above-described problems in two-piece mechanical latches. A single latch has a hook for engaging with the actuator and the one-piece structure including the hook is rotated by magnetic force, the actuator, or inertia force to open or close, which in turn latches the actuator rotated by the external force. Since a single latch does not have a component corresponding to the long lever, it will not be a cause of harmful vibration to the HDD, even if the HDD is in vibration.

On the other hand, since the single latch rotates without a long lever which shows a motion similar to that of the actuator, the latch's rotational movement to open or close does not agree with the actuator's rotational movement caused by the external impact. Accordingly, it is preferable to prevent the actuator from moving to above the magnetic disk without contacting the latch by widening the swing angle range (rotation range) of the single latch.

However, if the latch engages with the actuator at one point, widening the latch's swing angle range may increase the possibility of contact between the corner of the latch's engagement surface and the actuator. If the corner of the latch's engagement surface contacts the actuator, the latch's engagement surface does not engage with the actuator's engagement surface so that the latch might more likely bounce off the actuator. This results in that the latch turns into an open state and the actuator moves to above the magnetic disk.

Accordingly, a mechanism for a single latch is demanded that can more securely latch the actuator rotated by an external force. Besides, it is preferable that a two-piece mechanical latch have a mechanism that can latch the rotating actuator more securely.

BRIEF SUMMARY OF THE INVENTION

Embodiments of the present invention securely latch an actuator rotated by an external impact. In the embodiment of FIGS. 4(a) and 4(b), a latch 18 and an actuator 14 have a structure in which the latch 18 can latch the actuator 14 at two different swing angles. The swing angle of the latch 18 is an angle in rotation centered on a rotational shaft 181 (rotation angle). In FIG. 4(a), the latch is engaged with the actuator 14 at a shallow angle. In FIG. 4(b), the latch is engaged with the actuator 14 at a deeper angle. Since the latch 18 is able to latch the actuator at different swing angles, the actuator can be securely latched.

DETAILED DESCRIPTION OF THE INVENTION

Figure 1:
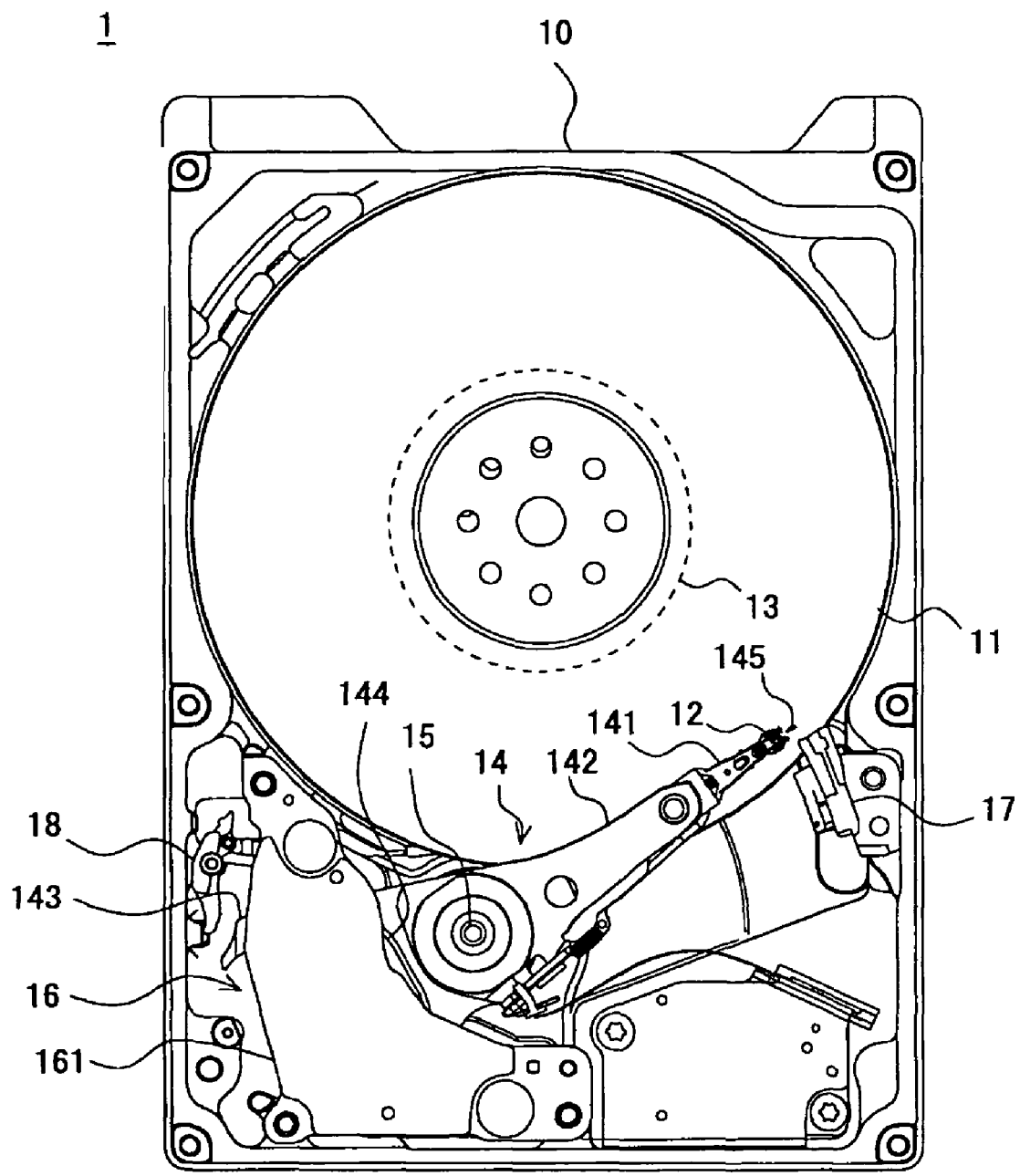
FIG. 1 is a plan view schematically illustrating an entire configuration of a hard disk drive according to an embodiment of the present invention.

Embodiments of the present invention relate to disk drive devices and magnetic disk devices, and more particularly, relate to a latch mechanism for latching an actuator which is rotated by an external force in a device.

A disk drive device according to an aspect of embodiments of the present invention comprises a head for accessing a data recording area of a disk, an actuator for supporting the head and for moving the head by rotating, and a latch for rotating about a rotational axis, and at a plurality of different swing angles, being capable of latching the actuator rotated toward the data recording area by an external force. The latch comprises a latch hook for latching the actuator by engaging with an actuator hook of the actuator. An engagement point differs at each of the plurality of different swing angles. A surface of the latch hook contacts a surface of the actuator hook at each of the different engagement points. The latch may comprise a one-piece structure having a bar and the latch hook, and the latch may be rotated by the actuator pushing the bar.

The latch hook may comprise a plurality of contact surfaces for each contacting the surface of the actuator hook, and each of the plurality of contact surfaces may have a different angle corresponding to each of the plurality of different swing angle. The latch hook may comprise a first surface for contacting the actuator and a second surface for contacting the actuator at a shallower swing angle than the first surface, and the first surface may be formed at a position closer to the rotational axis of the latch than the second surface. Furthermore, each of the plurality of different contact surfaces may be formed in a different level in the direction of the rotational axis of the latch.

The latch may be closed when the actuator is at a stand-by position. The actuator at the latching position at the first swing angle may be positioned farther from an edge of the disk than at the latching position at the second swing angle which is shallower than the first swing angle.

A magnetic disk device according to another aspect of embodiments of the present invention comprises a magnetic disk, a magnetic head for accessing the magnetic disk, an actuator for moving the magnetic head above the magnetic disk, and a latch being capable of stopping the movement of the actuator by an actuator hook of the actuator contacting a latch hook. The latch hook comprises at least two contact surfaces for contacting the actuator hook. Rotation angles from a stand-by position of the actuator when the actuator hook contacts the latch hook are different from each other depending on the contact surface. The actuator hook may comprise contact surfaces corresponding to the contact surfaces of the latch hook, and the contact surfaces of the latch hook and the contact surfaces of the actuator hook may become in face contact with each other.

The contact surfaces of the latch hook may be formed at positions different in the direction of the rotational axis of the latch. The contact surfaces of the latch hook may be formed with face angles different with respect to a rotational shaft of the latch.

The latch may further comprise a bar which is pushed by the actuator to close the latch, and is formed by a single piece of part.

A magnetic disk device according to the another aspect of embodiments of the present invention comprises a magnetic disk, a magnetic head for accessing the magnetic disk, an actuator for moving the magnetic head above the magnetic disk, and a latch being capable of stopping the movement of the actuator by an actuator hook of the actuator contacting a latch hook. The latch hook comprises a first contact surface and a second contact surface. A rotation angle of the actuator from a stand-by position when the actuator hook contacts the first contact surface of the latch hook is smaller than a rotation angle of the actuator from a stand-by position when the actuator hook contacts the second contact surface of the latch hook.

The actuator hook may comprise contact surfaces each corresponding to the first contact surface and the second contact surface of the latch hook, and the first contact surface and the second contact surface of the latch hook may become in face contact with the contact surfaces of the actuator hook.

The first contact surface and the second contact surface of the latch hook are formed at positions different in the direction of the rotational axis of the latch. Moreover, the first contact surface and the second contact surface of the latch hook may be formed with face angles different with respect to the rotational shaft of the latch.

The second contact surface of the latch hook may contact the contact surface of the actuator hook at a position where the latch has rotated by a specific rotation angle from a position in an open state, and the first contact surface of the latch hook may contact the contact surface of the actuator hook at a position where the latch has rotated by a greater rotation angle than the specific rotation angle from the position in the open state.

The latch mechanism according to embodiments of the present invention can more securely latch an actuator which is rotated by an external force.

Hereinafter, particular embodiments of the present invention will be described. For clarity of explanation, the following description and the accompanying drawings contain omissions and simplifications as appropriate. Throughout the drawings, like components are denoted by like reference numerals, and their repetitive description is omitted if not necessary for the sake of clarity. In the present embodiments, an HDD will be described by way of example of a disk drive device. The HDD according to the present embodiments has a mechanical latch for latching an actuator rotated by an inertia force induced by an external force.

In one embodiment, a one-piece mechanical latch (single latch) will be described as a mechanical latch. The single latch engages with an actuator rotated toward a data area by an inertia force induced by an external force to stop the rotation. A feature of the present embodiment is that the single latch has a plurality of latching points to the actuator. A single latch can latch the actuator at a plurality of different swing angles. This enables the single latch to latch the actuator securely.

FIG. 1 depicts an entire configuration of an HDD 1 with a mechanical latch 18 installed therein. A base 10 is secured with a top cover (not shown) for closing its top opening to form an enclosure and houses components of the HDD 1 therein. A spindle motor 13 spins a magnetic disk 11 at a specific angular rate. The magnetic disk 11, an example of a disk for storing data, has a magnetic layer which is magnetized to store data. A head slider 12, an example of a head, comprises a slider and a head element portion fixed to the slider surface. The head element portion contains a recording element and/or a reproducing element.

An actuator 14 is rotatably held by a rotational shaft 15 and is driven by a voice coil motor (VCM) 16. The actuator 14 holds the head slider 12 and rotates about the rotational shaft 15 to move the head slider 12. The actuator 14 comprises components of a suspension 141, an arm 142 for supporting the suspension 141 and having a bore for receiving the rotational shaft 15, a coil support 143, and a flat coil 144 on the inner peripheral side of the coil support 143, which are connected in order from the tip end of the actuator 14 where the head slider 12 is disposed. The VCM 16 consists of the flat coil 144 and two magnets (not shown) disposed so as to sandwich the flat coil 144. FIG. 1 shows a VCM yoke 161 for holding the upper magnet.

As exemplified in FIG. 1, the actuator 14 moves the head slider 12 over the data area of the spinning magnetic disk 11 to read or write data. Rotation of the actuator 14 allows the head slider 12 to move along the radial direction of the surface of the magnetic disk 11. The head slider 12 flies over the magnetic disk 11.

A ramp 17 is provided at the outer periphery of the magnetic disk 11, aside of the magnetic disk 11. When the HDD 1 does not access data, such as during non-operation or in an idling state, the actuator 14 is at a stand-by position on the ramp 17. In unloading the head slider 12, the actuator 14 rotates from above the data area of the magnetic disk 11 toward the ramp 17 (clockwise in FIG. 1), a tab 145 at the tip end of the actuator 14 slides and moves over the ramp 17, and the actuator 14 stops at the stand-by position. At this time, the head slider 12 is positioned away from the magnetic disk 11. In loading, the actuator 14 rotates in the direction reverse from the one in unloading and moves the head slider 12 to above the data area of the magnetic disk 11.

When the actuator 14 is at the stand-by position and the HDD 1 receives an external force, the actuator 14 may be rotated by an inertia force so that the actuator 14 and the head slider 12 are moved to above the data area of the magnetic disk 11. The head slider 12 sticks to the stationary magnetic disk 11. If the actuator 14 is suddenly loaded from the ramp 17, the head slider 12 vibrates violently. Then, the data in the data area, the head slider 12, or the suspension 141 is more likely to be damaged. A single latch (hereinbelow, referred to as a latch) 18 latches the rotating actuator 14 so that the external force will not move the head slider 12 or the suspension 141 to above the magnetic disk 11.

Figure 2:
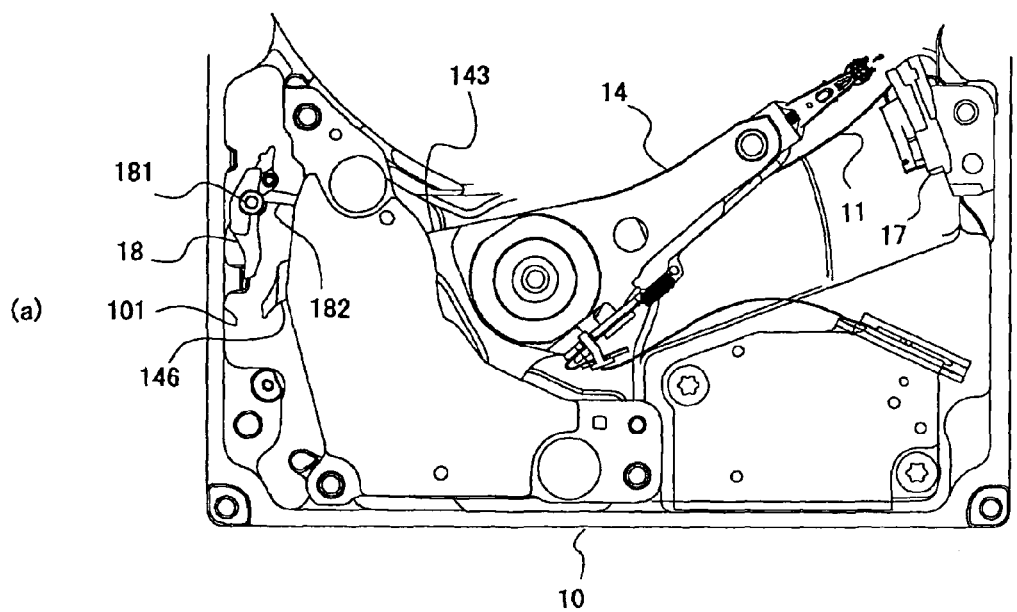
FIGS. 2(a) and 2(b) illustrate an actuator above a magnetic disk and a latch, and the actuator parking at a stand-by position and the latch, in one embodiment.
Figure 2:
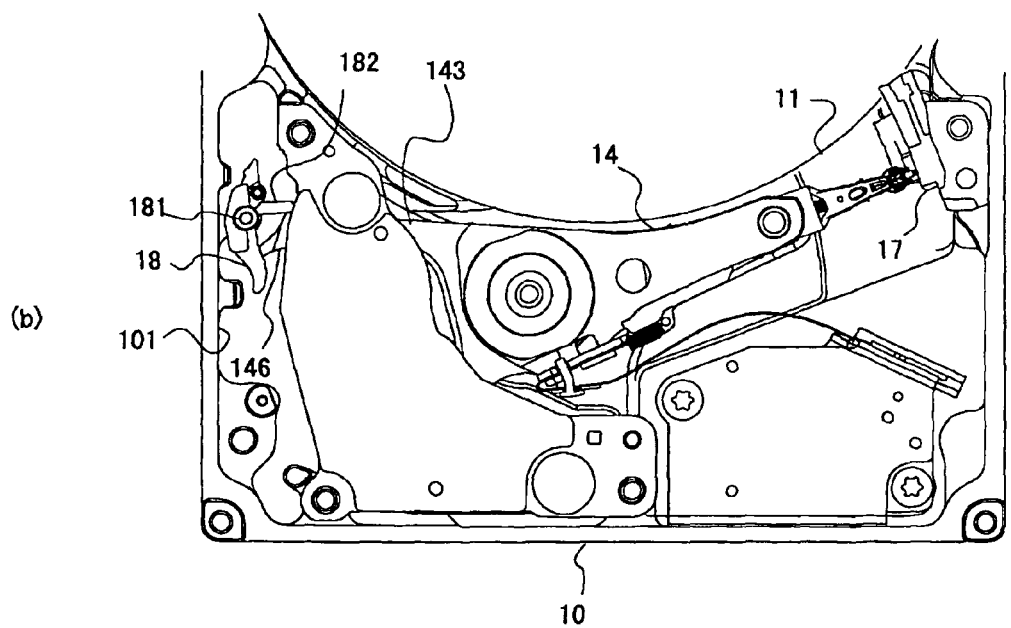

FIG. 2(a) depicts the actuator 14 positioned above the magnetic disk 11 and the latch 18. FIG. 2(b) depicts the actuator 14 parking at the stand-by position on the ramp 17 and the latch 18. The latch 18 rotates about a rotational shaft 181. When the actuator 14 is positioned above the magnetic disk 11, the latch 18 is in an open state. On the contrary, when the actuator 14 is positioned at the stand-by position, the latch 18 is in a closed state. The latch 18 in the closed state when the actuator 14 stays at the stand-by position enables the latch 18 to latch the actuator 14 more securely when an external impact is applied.

When the actuator 14 (the head slider 12) is unloaded to the stand-by position (moved from the FIG. 2(a) to FIG. 2(b)), the edge on the magnetic disk 11 side of the coil support 143 contacts and pushes a bar 182 of the latch 18. The actuator 14 rotating clockwise pushes the latch 18 to rotate it counterclockwise, resulting in that the latch 18 in the open state turns into the closed state.

FIGS. 3(a) to 3(d) are perspective views illustrating the structure of the latch 18. FIGS. 3(a) and 3(c) illustrate the structure of the latch 18 viewed from the actuator 14. FIGS. 3(b) and 3(d) illustrate the structure viewed from the opposite side. In FIGS. 3(a) and 3(b), the lower side of each figure corresponds to the bottom side of the base 10 and the upper side corresponds to the top cover side. In FIGS. 3(c) and 3(d), the upper side of each figure corresponds to the bottom side of the base 10 and the lower side corresponds to the top cover side.

The latch 18 is a one-piece mechanical latch and comprises a bar 182, a body 183, an arm 184, a latch hook 185, a counter weight 186, and a pin 187 made of a magnetic substance. The components except for the pin 187 form a one-piece structure, which is typically formed by integrally molding a resin such as polyacetal. A bore 188 is formed in the body 183 to receive the rotational shaft 181 of the latch 18.

The bar 182 for contacting the coil support 143 in unloading, which was described referring to FIGS. 2(a) and 2(b), has an arm 821 protruding from the body 183 toward the actuator 14 and a tab 822 extending vertically downward from the arm, where the reference numerals are shown in FIG. 3(b). Specifically, the coil support 143 contacts the tab 822 of the bar 182. Since the contact surface of the tab 822 to the coil support 143 is curved, even if rotation of the actuator 14 displaces the contact point to the coil support 143, proper contact condition can be achieved at any position.

The arm 184 extends from the body 183 vertically to the rotational shaft 181 and a latch hook 185 is formed at the end of the arm 184, extending vertically downward. The latch hook 185 engages with the hook 146 of the actuator 14 to latch the actuator 14 which is rotated toward the magnetic disk 11 by an external force. As shown in FIGS. 2(a) and 2(b), the actuator hook 146 is formed on the coil support 143. More specifically, the actuator hook 146 is located at the rear end on the magnetic disk 11 side of the coil support 143. The rotational shaft 15 of the actuator 14 is between the head slider 12 and the actuator hook 146.

The latch hook 185 and the tab 822 of the bar 182 are formed to have a specific angle centered at the bore 188 for the rotational shaft. The counter weight 186 is formed on the opposite side of the latch hook 185 across the rotational shaft 181 and places the center of gravity of the entire latch 18 within the diameter of the bore 188 for the rotational shaft A pin 187 is inset near the bar 182. The pin 187 is a magnetic substance and is attracted by the magnetic force of the magnets in the VCM 16. Referring to FIGS. 2(a) and 2(b), the latch 18 receives a bias force which rotates the latch 18 clockwise about the rotational shaft 182. This bias force keeps the latch 18 in an open state when the actuator 14 is positioned above the magnetic disk 11 as shown in FIG. 2(a). In FIG. 2(a), the latch 18 is in the most open state and the latch hook 185 is at the position closest to a side wall 101 of the base 10. Specifically, the tip end of the latch hook 185 is in contact with the protrusion on the side wall 101 of the base 10.

In a stand-by state shown in FIG. 2(b), the position of the latch 18 is maintained with the coil support 143 being in contact with the bar 182 of the latch 18. The latch hook 185 extends vertically downward and the arm 184 supporting the latch hook 185 is above the actuator hook 146 formed on the coil support 143 so as to overlap each other three-dimensionally. This enables the latch 18 to be disposed at the position overlapping the movement trajectory of the actuator hook 146 in the stand-by state so that the latch 18 can be placed in a limited space within the base 10.

Now, the method for loading the actuator 14 at the start-up will be described. When the HDD 1 is started up and spin of the magnetic disk 11 reaches a normal speed, the actuator 14 moves counterclockwise about its rotational shaft 15 at a specific speed away from the stand-by position. The latch 18 is rotated clockwise by the bias force from the pin 187 with movement of the actuator 14 so that the latch hook 185 is kept in contact with the inner side wall 101 of the base 10 (FIG. 2(a)).

Next, the method for unloading the actuator 14 will be described. The actuator 14 rotates clockwise about its rotational shaft 15, rides on the ramp 17, and stops at the stand-by position. In the rotation of the actuator 14, the left edge of the coil support 143 contacts the bar 182 of the latch 18 to rotate the latch 18 counterclockwise. In the stand-by state, the latch hook 185 is placed on the movement trajectory of the actuator hook 146 so that the latch 18 is in a closed state (FIG. 2(b)). Hereinafter, the closed state of the latch 18 when the actuator 14 is in the stand-by position will be referred to as a normal closed state. In the stand-by state, the latch hook 185 is disposed so as to prevent the actuator 14 from rotating in the direction of loading the head slider 12 from above the ramp 17.

Hereinafter, behaviors of the latch 18 and the actuator 14 when the HDD 1 in non-operation receives an external force will be described. The external force includes components of force in various directions and also moment for rotating the HDD 1. When the actuator 14 receives such moment, it rotates toward the magnetic disk 11 (counterclockwise rotation) or rotates away from the magnetic disk 11 (clockwise rotation), depending on the direction of the moment. In this way, the actuator 14 can rotate in either direction by an inertia force induced by an external force, but the actuator rotating clockwise hits a crash stop and rotates counterclockwise as a bounce. The latch 18 latches the counterclockwise rotating actuator 14 like those.

If the actuator 14 rotates toward the magnetic disk 11, the latch 18, as described above, is rotated in the direction to open (clockwise) by a magnetic bias force. In this way, the latch 18 in a rotating position closer to the open state than the normal closed state is referred to as a closed state at a shallow position. If the external impact is not so strong, the duration of the impact is approximately several milliseconds at the longest, and the rotational speed of the actuator 14 at receipt of an external force is relatively faster enough than that of the latch 18. Therefore, if the actuator 14 starts to rotate due to the impact, the latch 18 does not turn into an open state and the latch hook 185 can catch the actuator hook 146, so that the head slider 12 will never be loaded to above the magnetic disk 11.

In this way, the operation of the latch 18 is based on the duration for the latch 18 to rotate from a normal closed state to an open state. In loading, slower rotation of the actuator 14 relative to the duration of the latch 18 allows the latch 18 to release. When an HDD 1 receives an external impact, the latch 18 latches the actuator 14 utilizing a sufficiently shorter duration of rotation of the actuator 14 at an impact, namely a faster rotational speed.

On the contrary, if the HDD 1 receives a greater impact in the counterclockwise direction of the actuator 14, the actuator 14 and the latch 18 rotate counterclockwise. Namely, the latch 18 rotates counterclockwise further from the normal closed state (FIG. 2(b)) and the latch hook 185 goes into a deeper position than in the normal closed state. The latch 18 at a deeper rotating position than in the normal closed state like this is referred to as a closed state at a deeper position.

If a greater impact is applied in the clockwise direction of the actuator 14, just as the actuator 14 hits and bounce off the crush stop, the bar 182 of the latch 18 bounces off the coil support 143, so that the latch hook 185 goes more deeply (a closed state at a deeper position).

In this way, rotation of the actuator 14 and the latch 18 change depending on external impact. Therefore, it is difficult to accurately predict or control the motion of the latch 18 when the HDD 1 receives an external force. To latch the actuator 14 more securely with this sort of latch 18, the latch 18 may have a wider swing angle range (rotation range) than a normal two-piece latch. Specifically, it may have a larger rotation angle (stroke) in the counterclockwise direction. This allows the latch hook 185 rotating counterclockwise to stay longer at a position inner than the actuator hook 146, which in turn prevents the actuator 14 from moving to above the magnetic disk 11 without engaging with the latch 18.

Moreover, the latch 18 and the actuator 14 of one embodiment have a structure in which the latch 18 can latch the actuator 14 at a plurality of different swing angles. Specifically, the latch 18 of the present example described with reference to the drawings can latch the actuator 14 at two different swing angles.

Figure 3:
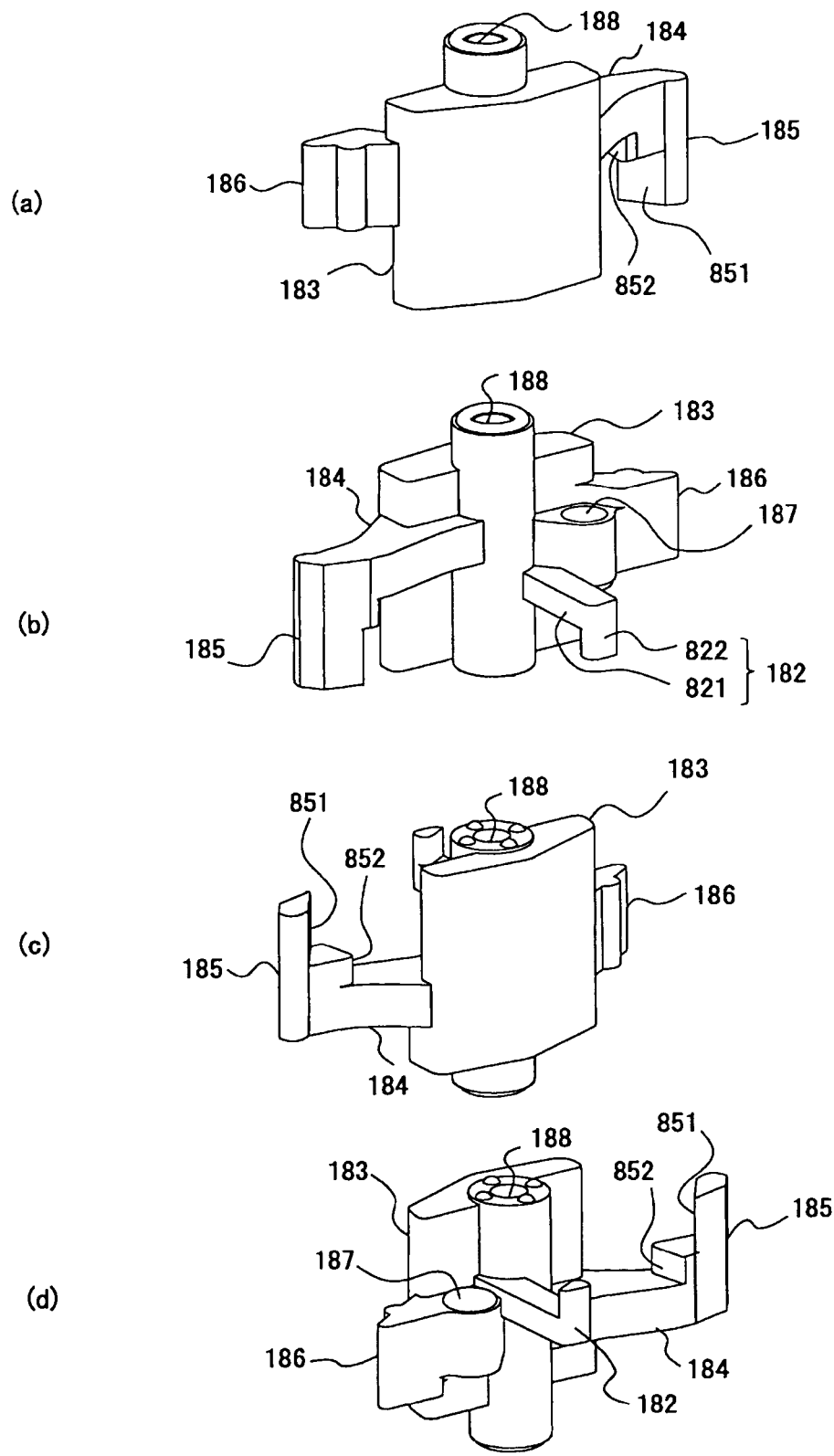
FIGS. 3(a)-3(d) are perspective views illustrating a structure of a single latch according to one embodiment.
Figure 4:
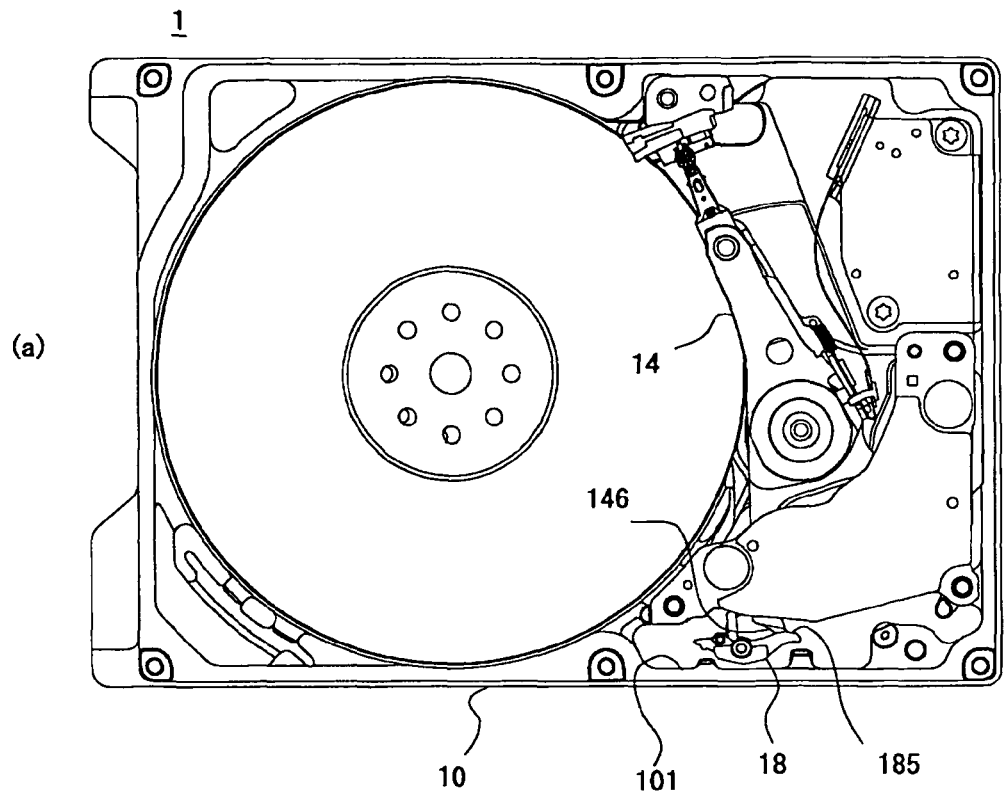
FIGS. 4(a) and 4(b) illustrate a latch engaged with an actuator at a shallow angle and the latch engaged with an actuator at a deeper angle in one embodiment.
Figure 4:
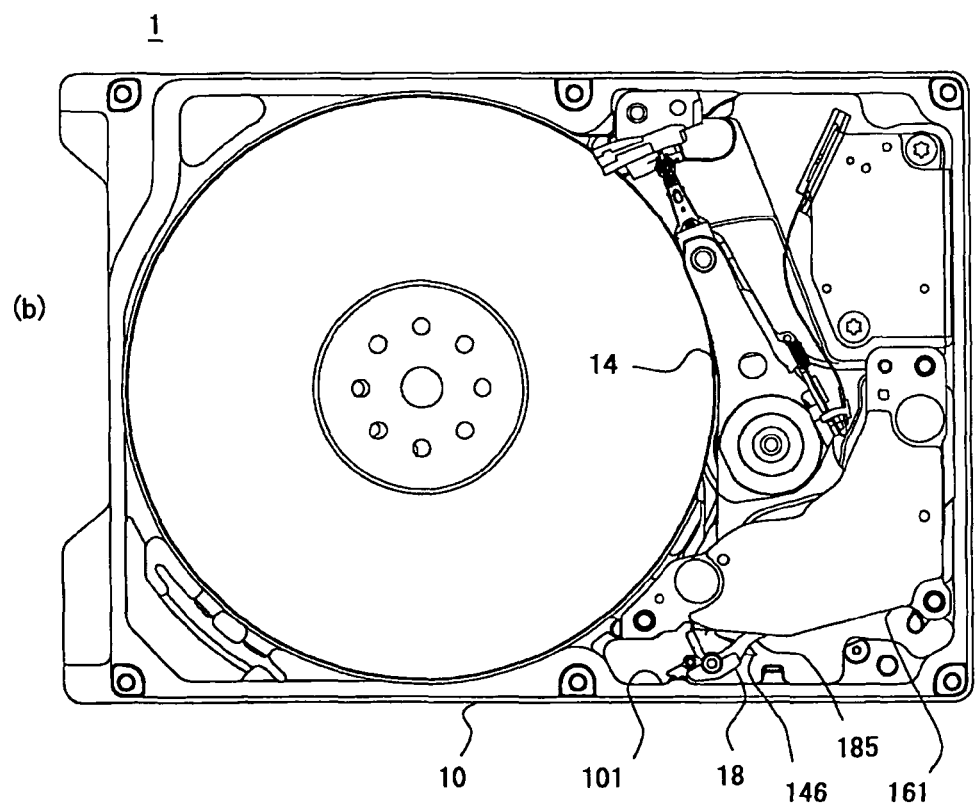

The swing angle of the latch 18 is an angle in the rotation (rotation angle) about the rotational shaft 181 and the latch 18 shown in FIG. 3 can latch the actuator 14 at two different rotation angles (rotational positions). In FIG. 4(a), the latch is engaged with the actuator 14 at a shallow angle. In FIG. 4(b), the latch 18 is engaged with the actuator 14 at a deeper angle.

The latch hook 185 (latch 18) at a shallow angle is positioned at a rotational position farther from the magnetic disk 11. The latch hook 185 (latch 18) at a deeper angle is positioned closer to the magnetic disk 11. In this way, the depth of the rotation angle of the latch 18 in closed states is defined with reference to that of the latch 18 in an open state and the state in which the latch hook 185 is positioned closest to the inner side wall 101 of the base 10 is the reference.

When the latch 18 latches the actuator 14 with a different engagement surface, the actuator 14 may be at a different rotational position. This achieves a proper latching according to the structures and motions of the latch 18 and the actuator 14. In addition, when the latch 18 latches the actuator 14 at a deeper angle, the actuator 14 may be at a position farther from the magnetic disk 11 (closer to the stand-by position) than when the latch 18 latches the actuator 14 at a shallow angle.

Considering the function of the latch 18, the actuator 14 may be latched at a position farther from the magnetic disk 11 and closer to the stand-by position. This is because that the latch hook 185 can stay deep, duration until the latch 18 turns into an open state can be saved, and the risk for the latch 18 to miss the actuator 14 is reduced.

In an HDD 1 with a mechanical latch 18 installed therein, a typical actuator 14 has a magnetic substance inserted into the coil support 146 and the magnetic force between the magnetic substance and the VCM 16 pulls the actuator 14 toward the stand-by position. This magnetic force will become weaker as the actuator 14 gets close to the magnetic disk 11. Accordingly, when the actuator 14 receives an impact after once being caught in the latch 18, the actuator 14 positioned closer to the stand-by position can receive a greater break force, so that it becomes harder for the actuator 14 to go to above the magnetic disk 11.

On the other hand, if the latching point of the actuator 14 is closer to the magnetic disk 11, the duration for the actuator 14 to move from the stand-by position to the latching point gets longer, so that a margin (a margin for the actuator 14 to go to above the magnetic disk 11 without getting latched by the latch 18) in a normal loading will increase. Unless receiving an external impact, the latch 18 will not go deeply, so it is unnecessary to consider the load margin in latching at a deeper angle. Therefore, when the latch 18 latches the actuator 14 at a shallow angle as in the foregoing description, the actuator 14 may be closer to the magnetic disk 11 than when the latch 18 latches the actuator 14 at a deeper angle.

FIGS. 5(a) and 5(b) illustrate an engagement part between the latch 18 and the actuator 14 at a shallow angle. FIGS. 6(a) and 6(b) illustrate an engagement part between the latch 18 and the actuator 14 at a deeper angle. FIGS. 5(a) and 6(a) are figures of the engagement part viewed from the top cover, and FIGS. 5(b) and 6(b) are figures of the engagement part viewed from the rear side of the flat coil 144 (the side wall 101 of the base 10).

As shown in FIGS. 5(a), 5(b), 6(a), and 6(b), the latch hook 185 engages with the actuator hook 146 for the latch 18 to latch the actuator 14. An engagement at a shallow angle and an engagement at a deeper angle are different in engagement point of the latch hook 185. Specifically, the latch hook 185 has a lower engagement surface 851 and an upper engagement surface 852 as shown in FIGS. 3(a) to 3(d). The upper engagement surface 852 is located upper than the lower engagement surface 851, namely closer to the top cover, in the direction of the rotational shaft 181 of the latch 18. The lower engagement surface 851 is located closer to the inner bottom of the base 10 than the upper engagement surface 852 in the direction of the rotational shaft 181.

Figure 5:
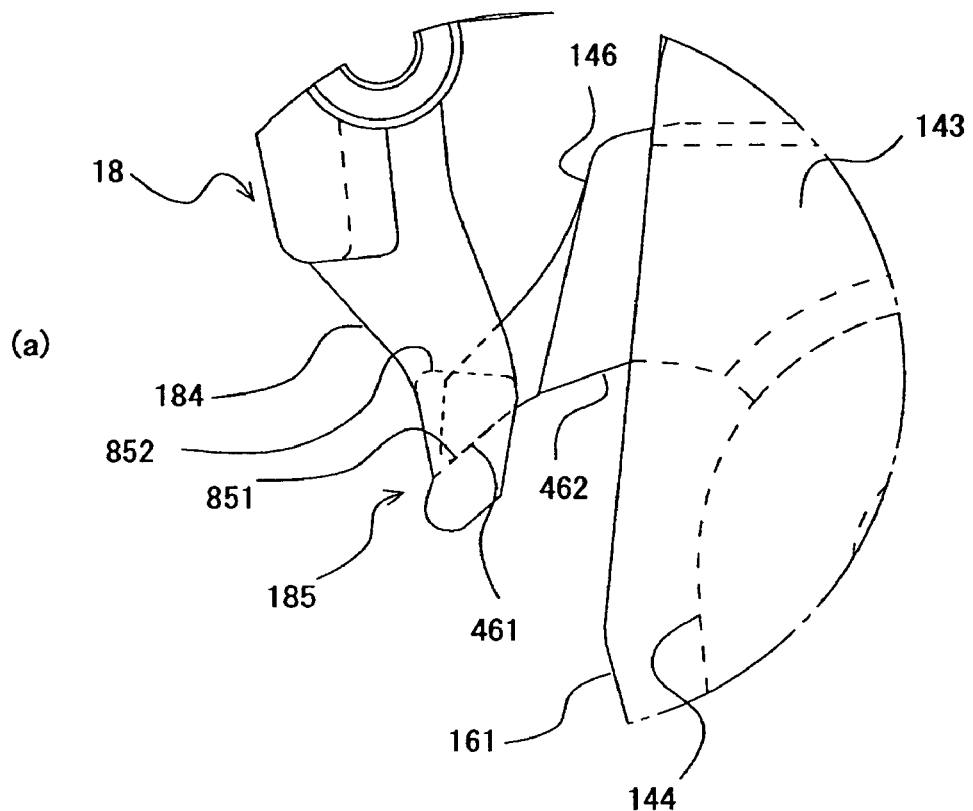
FIGS. 5(a) and 5(b) illustrate an engagement part between the latch and the actuator at a shallow angle in one embodiment.
Figure 5:
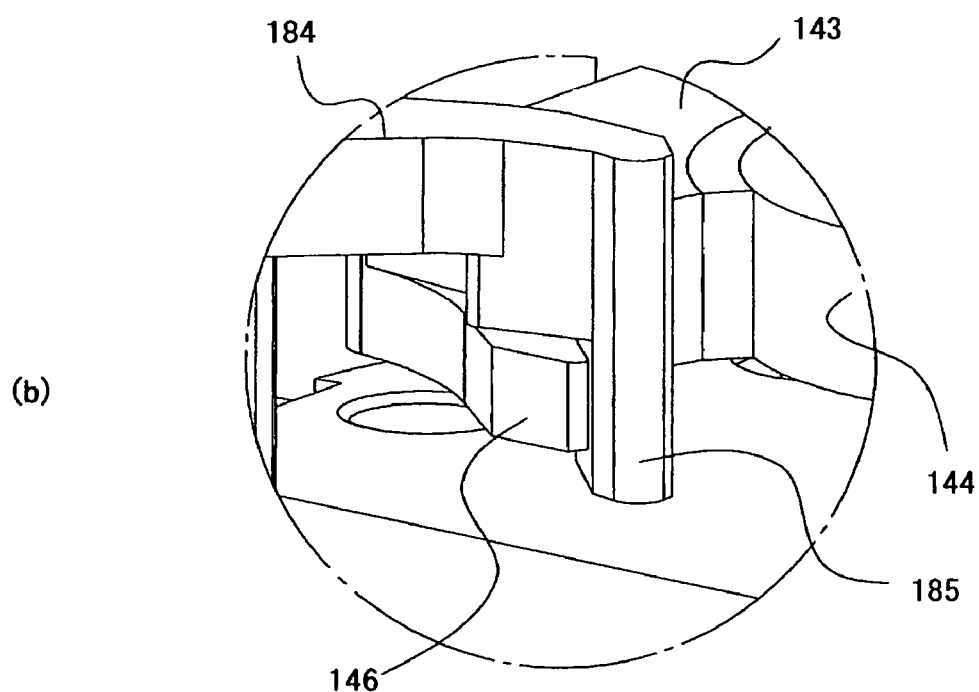
Figure 6:
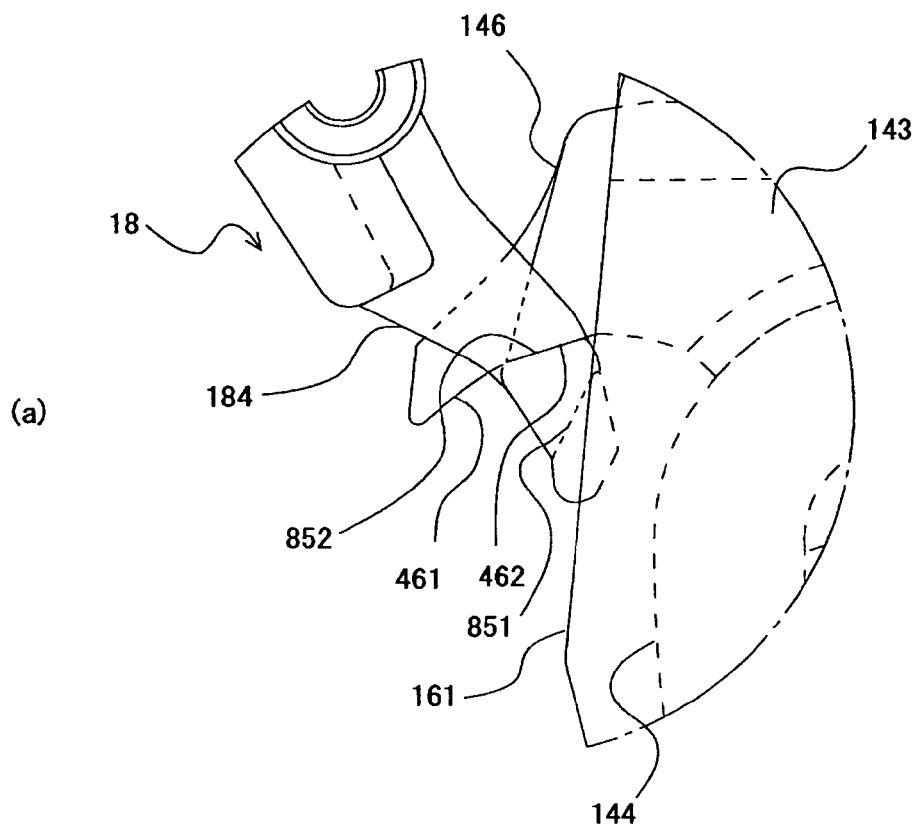
FIGS. 6(a) and 6(b) illustrate the engagement part between the latch and the actuator at a deeper angle in one embodiment.
Figure 6:
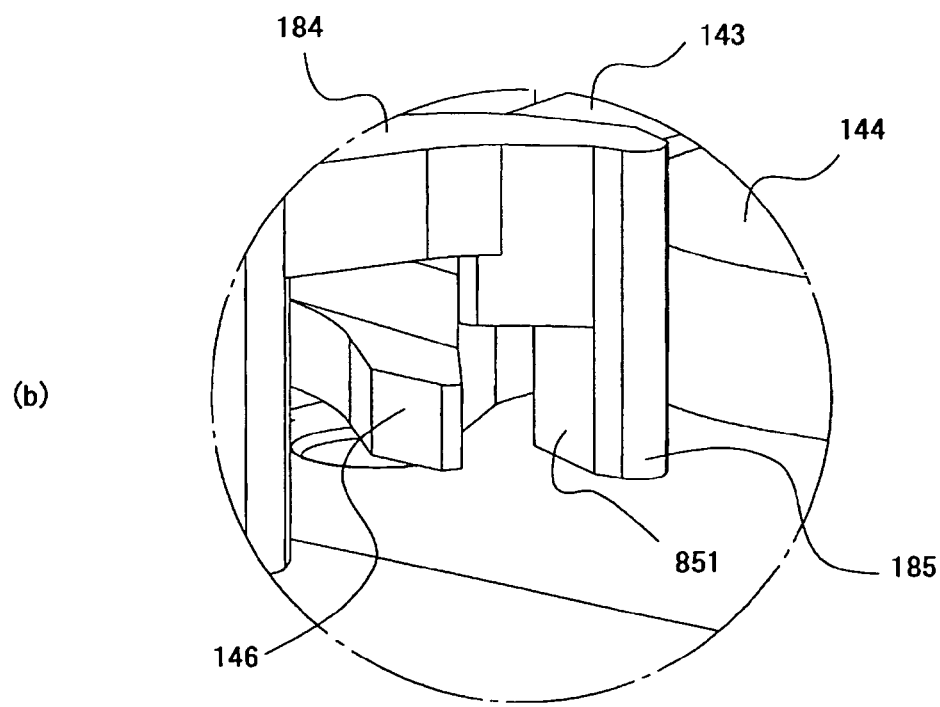

At a shallow angle, the lower engagement surface 851 of the latch hook 185 is in contact with the surface of the actuator hook 146. On the other hand, at a deeper angle, the upper engagement surface 852 of the latch hook 185 is in contact with the surface of the actuator hook 146. As shown in FIGS. 3, 5, and 6, the upper engagement surface 852 of the latch hook 185 is closer to the rotational shaft 181 of the latch 18 than the lower engagement surface 851.

Figure 7:
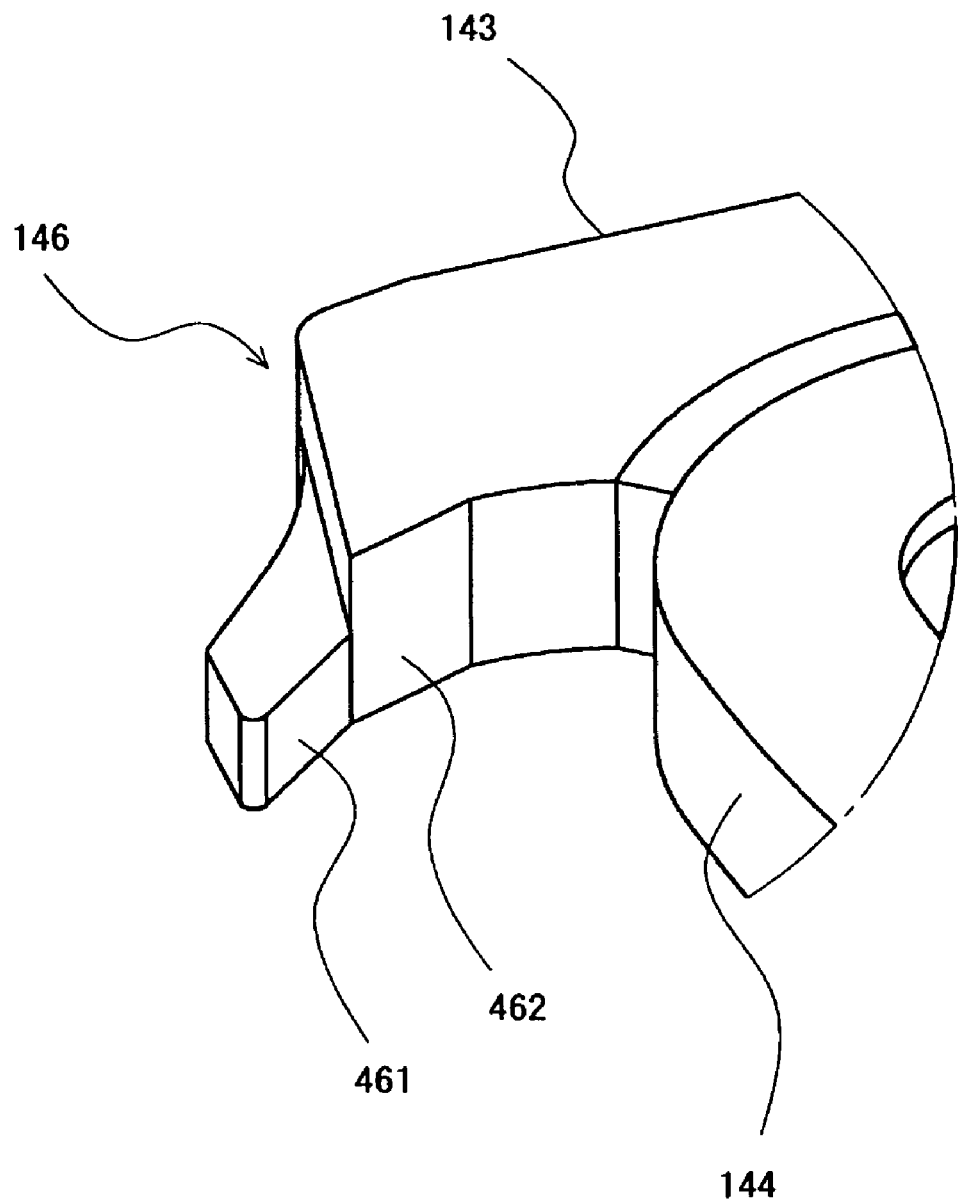
FIG. 7 is a perspective view illustrating the structure of the actuator hook in one embodiment.
Figure 8:
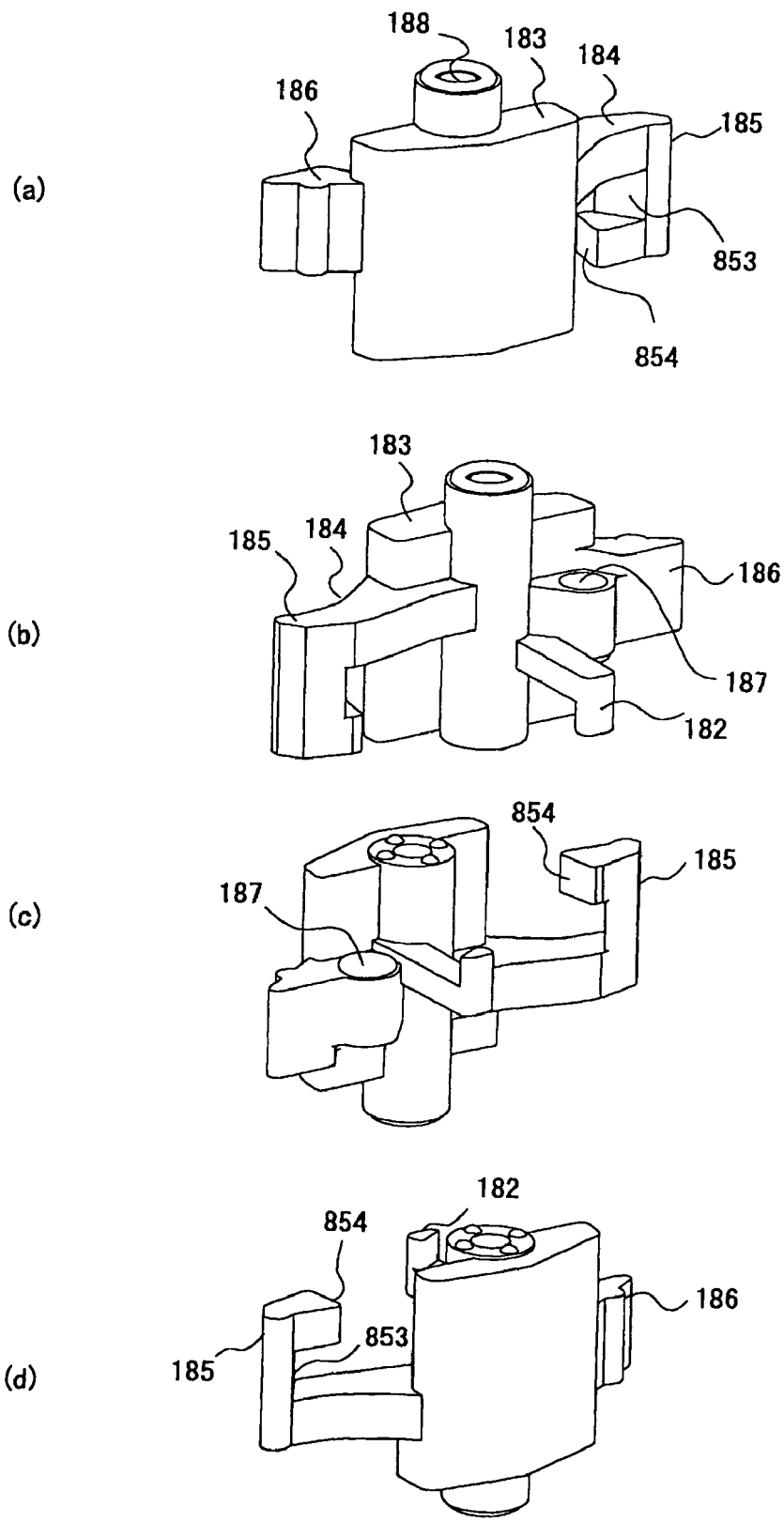
FIGS. 8(a)-8(d) are perspective views illustrating the structure of a single latch according to an embodiment.
Figure 9:
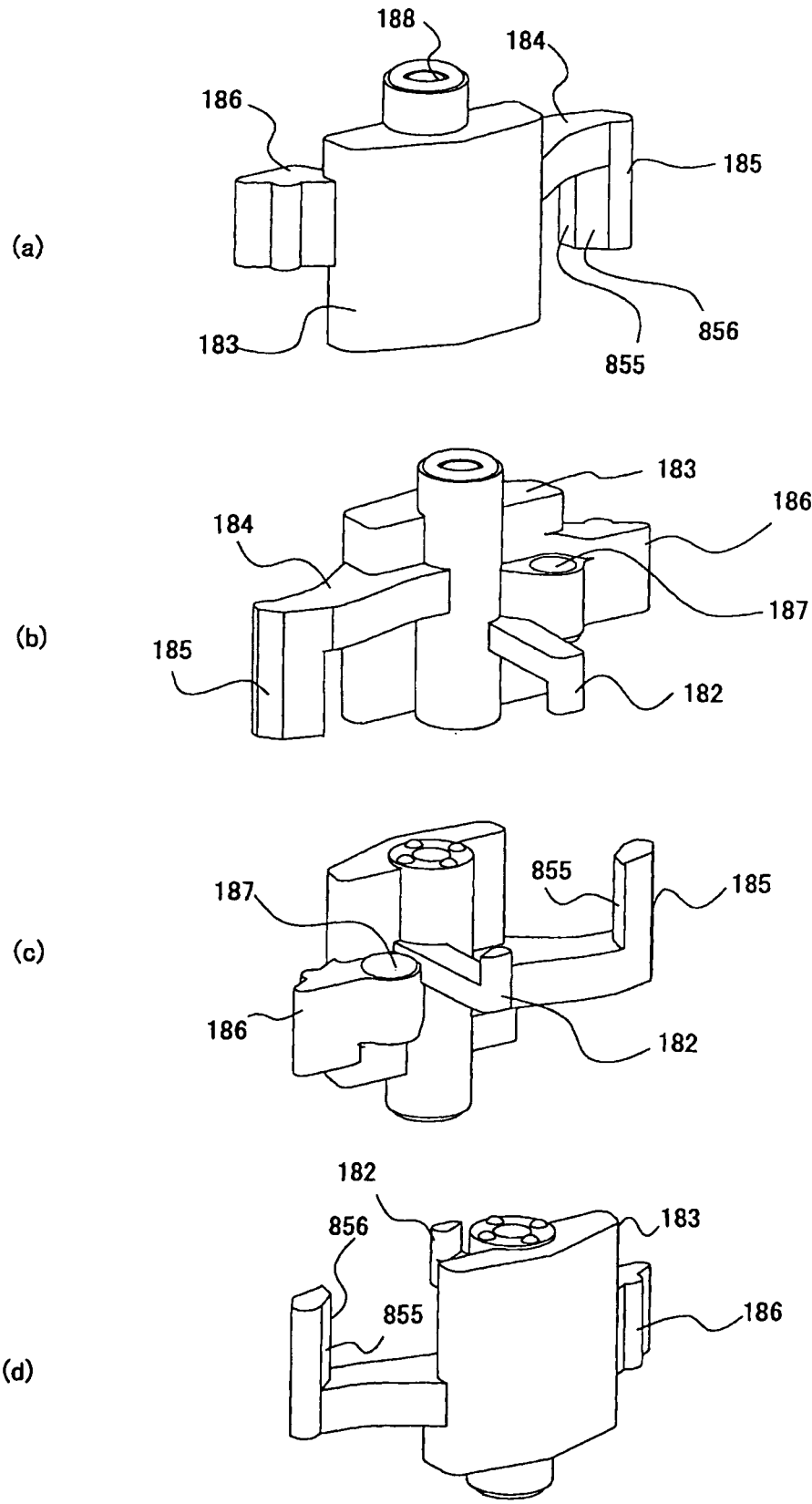
FIGS. 9(a)-9(d) are perspective views illustrating the structure of a single latch according to an embodiment.

The engagement at a shallow angle and the engagement at a deeper angle are different in engagement point of the actuator hook 146. FIG. 7 is a partial perspective view illustrating a structure of the actuator hook 146. As shown in FIG. 7, the actuator hook 146 has an outer engagement surface 461 and an inner engagement surface 462 which is provided on the flat coil 144 side of the outer engagement surface 461. The engagement surfaces 461 and 462 are formed on the front side of the actuator hook 146 when the actuator 14 rotates toward the data area of the magnetic disk 11. The inner engagement surface 462 is closer to the rotational shaft 15 of the actuator 14 than the outer engagement surface 461. The engagement surfaces 851, 852 of the latch hook 185 and the engagement surfaces 461, 462 of the actuator hook 146 are parallel to the rotational shaft 181 of the latch 18 and the rotational shaft 15 of the actuator 14.

As shown in FIGS. 5(a) and 5(b), at a shallow angle, the outer engagement surface 461 of the actuator hook 146 farther from the flat coil 144 is in contact with the lower engagement surface 851 of the latch hook 185. On the other hand, as shown in FIGS. 6(a) and 6(b), at a deeper angle, the inner engagement surface 462 of the actuator hook 146 closer to the flat coil 144 is in contact with the upper engagement surface 852 of the latch hook 185. In this way, surfaces of the latch hook 185 and the actuator hook 146 are in contact (face contact) with each other so that the latch 18 can securely latch the actuator 14.

At a deeper angle, the upper engagement surface 852 closer to the rotational shaft 181 of the latch 18 engages with the inner engagement surface 462 closer to the rotational shaft 15 of the actuator 14. Thus, the surfaces 852 and 462 which are closer to the rotational shaft 181 of the latch hook 185 and the rotational shaft 15 of the actuator hook 146, respectively, contact with each other at a deeper angle. This allows the actuator 14 to be latched at a position closer to the stand-by position, and further allows preparation for a continuous impact caused by a free fall of a computer system onto a floor or successive impacts in a computer system set on a rack.

As shown in FIGS. 3(a) to 3(d), the latch hook 185 has two levels of engagement surfaces 851 and 852 in its rotational shaft 181. The engagement surfaces 851 and 852 of the present embodiment are not curved but flat. The inner engagement surface 462 and the outer engagement surface 461 of the actuator hook 146 are the same. When an inertia force rotates the actuator 14 toward the magnetic disk 11, the latch hook 185 can securely engage with the actuator hook 146 without interfering with loading of the actuator 14.

The engagement surfaces 851 and 852 formed at the different positions in the top-bottom direction allows to extend the widths (the sizes in the vertical direction to the latch's rotational shaft 181) of the engagement surfaces 851 and 852 to contact the actuator hook 146 without increasing the size in the radial direction (the vertical direction to the rotational shaft 181) of the latch hook 185.

The lower engagement surface 851 and the upper engagement surface 852 of the latch hook 185 have different angles. This allows the lower engagement surface 851 and the upper engagement surface 852 to engage with the actuator hook 146 at different rotational positions without interfering with normal rotations of the actuator 14. The angles of the lower engagement surface 851 and the upper engagement surface 852 depend on the angles of the outer engagement surface 461 and the inner engagement surface 462 of the actuator 14, respectively.

To surely avoid interference with normal rotations of the actuator 14, the inner engagement surface 462 is parallel to the outer engagement surface 461, or as shown in FIG. 7, the inner engagement surface 462 is canted with respect to the outer engagement surface 461 and the inner edge (the edge close to the rotational shaft 15) of the inner engagement surface 462 is close to the flat coil 144. In other words, the outer engagement surface 461 and the inner engagement surface 462 form a concave on the side close to the flat coil 144 and form a convex on the side farther from the flat coil 144.

The lower engagement surface 851 and the upper engagement surface 852 of the latch hook 185 have angles so as to contact respectively the outer engagement surface 461 and the inner engagement surface 462 having the above-described angles at specific rotational positions. More specifically, as shown in FIGS. 5(a) and 6(a), the upper engagement surface 852 is canted clockwise with respect to the lower engagement surface 851. In the examples in FIGS. 5(a) and 6(a), the left edge of the lower engagement surface 851 is closer to the latch's rotational shaft 181 than the right edge, and vise versa for the left edge of the upper engagement surface 852. In this regard, the distances from the left and right edges of the lower engagement surface 851 or the upper engagement surface 852 to the latch's rotational shaft 181 may be the same.

The actuator hook 146 is formed at the rear end corner on the magnetic disk 11 side (left side) of the coil support 145. The line connecting the rotational shaft 181 of the latch 18 and the rotational shaft 15 of the actuator 14 is always located on the magnetic disk 11 side of the engagement surfaces 461 and 462 of the actuator hook 146 and at the position closer to the magnetic disk 11, regardless of the rotational position of the actuator 14.

The swing angle range of the latch 18 is defined according to the contact between the latch 18 and the inner wall 101 of the base 10. When the latch 18 is in an open state as shown in FIG. 2(a), the surface on the latch hook 185 side of the latch 18 is in contact with the inner wall 101. As shown in FIG. 4(b), when the latch 18 is rotated counterclockwise maximally, the latch 18 is in contact with the inner wall 101 on the opposite side from the latch hook 185.

When the latch 18 of the present example is engaged with the actuator 14 at a deeper swing angle as shown in FIGS. 4(b) and 6(a), a part of the tip is overlapped with the magnet holding plate. When the latch 18 engages with the actuator 14 at a shallow swing angle, it is not overlapped with the VCM yoke. Widening the swing angle range in which the latch 18 can latch the actuator 14 enables the latch 18 to latch the actuator 14 more securely.

As described above, the latch hook 185 may have a plurality of engagement surfaces different in levels in the direction parallel to the latch's rotational shaft 181. The number of engagement surfaces (the number of latching points) may be three or more. If the number of engagement surfaces increases, the area of each engagement surface decreases, so that the number of engagement surfaces can be increased within the range where necessary area can be assured. If the latch hook 185 has three or more engagement surfaces, the angle of each engagement surface varies step-by-step from the uppermost engagement surface to the lowermost engagement surface.

The positions of the engagement surfaces at a deeper angle and at a shallow angle are not limited to the example of the latch 18 which has been explained with reference to FIGS. 3(a) to 3(d). For example, as shown in FIGS. 8(a) to 8(d), an upper engagement surface 853 may engage with the actuator hook 146 at a shallow angle and a lower engagement surface 854 may engage with the actuator hook 146 at a deeper angle. The upper and lower positions of the engagement surfaces can be selected as appropriate according to the shape of the latch 18 and the manufacturing method thereof.

Unlike the above-described latch mechanism in which the engagement surfaces are stacked with respect to the latch's rotational shaft 181, a plurality of engagement surfaces may be provided in such a manner that they are placed side-by-side in the direction vertical to the latch's rotational shaft 181. A latch 18 shown in FIGS. 9(a) to 9(d) has an engagement surface 855 at a deeper angle and an engagement surface 856 at a shallow angle and these engagement surfaces 855 and 856 are placed side-by-side in the direction vertical to the direction where the latch's rotational shaft 181 extends. The sizes of the engagement surfaces in the direction of the latch's rotational shaft 181 are the same.

Specifically, the engagement surface 855 at a deeper angle is closer to the latch's rotational shaft 181 (the bore 188 for the rotational shaft) than the engagement surface 856 at a shallow angle. The engagement surfaces 855 and 856 are canted in such a manner that they form a convex toward the latch's rotational shaft 181 (the bore 188 for the rotational shaft). The structure except for the engagement surfaces 855 and 856 is substantially the same as the latch structure which has been explained with reference to FIGS. 3(a) to 3(d).

As set forth above, the present invention is described by way of a particular embodiments but is not limited to the above embodiments. A person skilled in the art can easily modify, add, and convert each element in the above embodiments within the scope of the present invention. In the present embodiments, an HDD using a magnetic disk has been described as a disk drive device, but the recording method is not particularly limited as long as a disk type of recording medium is applied to the disk drive device. Embodiments of the present invention are particularly useful to a single latch but can be applied to a two-piece mechanical latch.

The latch according to embodiments of the present invention can be applied to an HDD using a contact start-stop scheme in which an actuator stands by in an inner diameter area of a magnetic disk. The engagement point between the latch and the actuator may be different positions in the same engagement surface. The engagement surfaces of the latch or the actuator may be continuous, or they may be separated. The engagement hook of the actuator may be formed at the position described above, or may be formed at other places and the latch is disposed to match the place.

What is claimed is:

1. A disk drive device comprising:
   a head for accessing a data recording area of a disk;
   an actuator for supporting the head and for moving the head by rotating; and
   a latch for rotating about a rotational axis, and at a plurality of different swing angles, and being capable of latching the actuator rotated toward the data recording area by an external force; wherein the latch comprises a latch hook for latching the actuator by engaging with an actuator hook of the actuator;
   an engagement point differs at each of the plurality of different swing angles; and
   a surface of the latch hook contacts a surface of the actuator hook at each of the different engagement points wherein the actuator at the latching position at the first swing angle is positioned farther from an edge of the disk than at the latching position at the second swing angle which is shallower than the first swing angle.

2. The disk drive device according to claim 1, wherein the latch comprises a one-piece structure having a bar and the latch hook; and
   the latch is rotated by the actuator pushing the bar.

3. The disk drive device according to claim 1, wherein the latch hook comprises a plurality of contact surfaces for each contacting the surface of the actuator hook; and
   each of the plurality of contact surfaces has a different angle corresponding to each of the plurality of different swing angle.

4. The disk drive device according to claim 3, wherein the latch hook comprises a first surface for contacting the actuator and a second surface for contacting the actuator at a shallower swing angle than the first surface; and
   the first surface is formed at a position closer to the rotational axis of the latch than the second surface.

5. The disk drive device according to claim 3, wherein each of the plurality of different contact surfaces is formed in a different level in the direction of the rotational axis of the latch.

6. The disk drive device according to claim 5, wherein the plurality of different contact surfaces are located at different distances from the rotational axis of the latch.

7. The disk drive device according to claim 2, wherein the latch is closed when the actuator is at a stand-by position.

8. A magnetic disk device comprising:
   a magnetic disk;
   a magnetic head for accessing the magnetic disk;
   an actuator for moving the magnetic head above the magnetic disk; and
   a latch being capable of stopping the movement of the actuator by an actuator hook of the actuator contacting a latch hook; wherein the latch hook comprises at least two contact surfaces for contacting the actuator hook; and
   rotation angles from a stand-by position of the actuator when the actuator hook contacts the latch hook are different from each other depending on the contact surface and wherein the actuator at the latching position at the first swing angle is positioned farther from an edge of the disk than at the latching position at the second swing angle which is shallower than the first swing angle.

9. The magnetic disk device according to claim 8, wherein the actuator hook comprises contact surfaces corresponding to the contact surfaces of the latch hook; and the contact surfaces of the latch hook and the contact surfaces of the actuator hook become in face contact with each other.

10. The magnetic disk device according to claim 8, wherein the contact surfaces of the latch hook are formed at positions different in the direction of the rotational axis of the latch.

11. The magnetic disk device according to claim 10, wherein the contact surfaces of the latch hook are formed with face angles different with respect to a rotational shaft of the latch.

12. The magnetic disk device according to claim 8, wherein the latch further comprises a bar which is pushed by the actuator to close the latch, and is formed by a single piece of part.

13. A magnetic disk device comprising:
   a magnetic disk;
   a magnetic head for accessing the magnetic disk;
   an actuator for moving the magnetic head above the magnetic disk; and
   a latch being capable of stopping the movement of the actuator by an actuator hook of the actuator contacting a latch hook; wherein the latch hook comprises a first contact surface and a second contact surface; and a rotation angle of the actuator from a stand-by position when the actuator hook contacts the first contact surface of the latch hook is smaller than a rotation angle of the actuator from a stand-by position when the actuator hook contacts the second contact surface of the latch hook and wherein the actuator at the latching position at the first swing angle is positioned farther from an edge of the disk than at the latching position at the second swing angle which is shallower than the first swing angle.

14. The magnetic disk device according to claim 13, wherein the actuator hook comprises contact surfaces each corresponding to the first contact surface and the second contact surface of the latch hook; and the first contact surface and the second contact surface of the latch hook become in face contact with the contact surfaces of the actuator hook.

15. The magnetic disk device according to claim 13, wherein the first contact surface and the second contact surface of the latch hook are formed at positions different in the direction of the rotational axis of the latch.

16. The magnetic disk device according to claim 15, wherein the first contact surface and the second contact surface of the latch hook are formed with face angles different with respect to the rotational shaft of the latch.

17. The magnetic disk device according to claim 13, wherein the second contact surface of the latch hook contacts the contact surface of the actuator hook at a position where the latch has rotated by a specific rotation angle from a position in an open state; and the first contact surface of the latch hook contacts the contact surface of the actuator hook at a position where the latch has rotated by a greater rotation angle than the specific rotation angle from the position in the open state.

\* \* \* \* \*